(12) United States Patent
Korn et al.

(10) Patent No.: US 7,348,541 B1
(45) Date of Patent: Mar. 25, 2008

(54) OPTICAL CHANNEL MONITORING SYSTEM WITH SIMULTANEOUS C-BAND AND L-BAND DETECTION

(75) Inventors: Jeffrey A. Korn, Lexington, MA (US); Dale C. Flanders, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 1826 days.

(21) Appl. No.: 09/648,263

(22) Filed: Aug. 25, 2000

Related U.S. Application Data

(60) Provisional application No. 60/186,800, filed on Mar. 3, 2000.

(51) Int. Cl.
*H04B 10/08* (2006.01)
*G01N 21/25* (2006.01)

(52) U.S. Cl. .................................. 250/227.23; 398/34

(58) Field of Classification Search ........... 250/227.11, 250/227.23; 398/34, 9, 13, 14
See application file for complete search history.

(56) References Cited

U.S. PATENT DOCUMENTS

| | | | |
|---|---|---|---|
| 5,754,322 A | 5/1998 | Ishikawa et al. | 359/135 |
| 5,798,855 A | 8/1998 | Alexander et al. | 359/177 |
| 6,262,822 B1 * | 7/2001 | Obhi et al. | 398/9 |

FOREIGN PATENT DOCUMENTS

WO 99/34484 7/1999

OTHER PUBLICATIONS

MEM-TUNE Tunable Filter, Preliminary Data Sheet DS00553, May 2000, CoreTek, Inc., 299 Ballardvale Street, Wilmington, MA 01887.
OPM-1 Optical Performance Monitor, Preliminary Data Sheet, DS00555, May 2000, CoreTek, Inc., 299 Ballardvale Street, Wilmington, MA 01887.
Kani, J.; Jinno, M.; Sakamoto, T.; Aisawa, S.; Fukui, M.; Hattori, K.; and Oguchi, K., "Interwavelength-Band Nonlinear Interactions and Their Suppression in Multiwavelength-Band WDM Transmission Systems," Journal of Lightwave Technology, vol. 17, No. 11, Nov. 1999, pp. 2249-2260.

* cited by examiner

*Primary Examiner*—John R. Lee
(74) *Attorney, Agent, or Firm*—Houston Eliseeva LLP

(57) ABSTRACT

A monitoring system has the capability to monitor multiple signal bands simultaneously. Specifically, in one embodiment, the monitoring system can simultaneously monitor the C- and L-bands. As a result, the time to scan through the spectral band can be reduced by half. The system comprises a signal source for an optical signal having spectrally separated channels distributed within a first spectral band and a second spectral band. A tunable filter filters this optical signal. A dichroic filter separates the first spectral band from the second spectral band in the optical signal, which has been filtered by the tunable filter. Thereafter, first and second optical detectors detect the respective spectral bands to the filtered optical signal.

15 Claims, 9 Drawing Sheets

OPTICAL CHANNEL MONITORING SYSTEM WITH SIMULTANEOUS C-BAND AND L-BAND DETECTION

RELATED APPLICATIONS

This application claims the benefit of the filing date of U.S. Provisional Application No. 60/186,800, filed Mar. 3, 2000, which is incorporated herein by this reference in its entirety.

This application is related to application Ser. No., entitled, and filed on an even date herewith, which is incorporated herein by this reference in its entirety.

BACKGROUND OF THE INVENTION

Wavelength division multiplexing (WDM) systems typically comprise multiple separately modulated laser diodes at the transmitter. These laser diodes are tuned to operate at different wavelengths. When combined in an optical fiber, the WDM optical signal comprises a corresponding number of spectrally separated channels. Along the transmission link, the channels are typically collectively amplified in gain fiber, such as erbium-doped fiber and/or regular fiber, in a Raman pumping scheme. At the receiving end, the channels are usually separated from each other using thin film filter systems, to thereby enable detection by separate photodiodes.

The advantage of WDM systems is that the transmission capacity of a single fiber can be increased. Historically, only a single channel was transmitted in each optical fiber. In contrast, modern WDM systems contemplate hundreds or thousands of spectrally separated channels per fiber. This yields concomitant increases in the data rate capabilities of each fiber. Moreover, the cost per bit of data for WDM systems is typically less than comparative non-multiplexed systems. This is because any amplification system required along the link can essentially be shared by all of the separate channels transmitted in a single fiber link. With non-multiplex systems, each channel/fiber would require its own amplification system.

Nonetheless, there are challenges associated with implementing WDM systems. First, the transmitters and receivers are substantially more complex since, in addition to the laser diodes and receivers, additional optical components are required to combine the channels into, and separate out the channels from, the WDM optical signal. Moreover, there is the danger of channel drift where the channels loose their spectral separation and overlap each other. This interferes with channel separation and demodulation at the receiving end.

SUMMARY OF THE INVENTION

Nonetheless, as these WDM systems become more complex, technology is allowing the packing of more and more channels within the same frequency bands. Presently, systems having 1,000 channels and more are being proposed.

Thus, the optical monitoring system must have the capability to scan through the entire signal spectral band. As the number of channels increases, this can take longer and longer. Further, as more channels are added, the necessity of monitoring smaller guard bands increases.

The present invention is directed to a monitoring system that has the capability to monitor multiple signal bands simultaneously. Specifically, in one embodiment, the monitoring system can simultaneously monitor the C- and L-bands. As a result, the time to scan through the spectral band can be reduced by half.

In general, according to one aspect, the monitoring system comprises a signal source for an optical signal having spectrally separated channels distributed within a first spectral band and a second spectral band. A tunable filter filters this optical signal. A dichroic filter separates the first spectral band from the second spectral band in the optical signal, which has been filtered by the tunable filter. Thereafter, first and second optical detectors detect the respective spectral bands in the filtered optical signal. As a result, the system is compatible with simultaneous monitoring in multiple bands. This can be used to reduce the time necessary to scan through the carrier signals in a WDM optical signal.

In the preferred embodiment, a reference source generates a reference signal outside of the first and second spectral bands. A reference signal detector detects this reference signal post filtering by the tunable filter.

In the preferred embodiment, the simultaneous scanning is accomplished by selection of the free spectral range of the tunable filter. Specifically, the free spectral range is greater than a range of the first spectral band and the second spectral band individually, but less than the sum of the first spectral band and the second spectral band.

In general, according to another aspect, the invention also features a method for optical signal monitoring. This method comprises receiving an optical signal having spectrally separated channels that are distributed within a first spectral band and a second spectral band and then filtering that optical signal. The first spectral band is then separated from the second spectral band and each band is thereafter detected.

In the preferred embodiment, the free spectral range in the tunable filter is selected to enable simultaneous detection of the first spectral band and the second spectral band.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
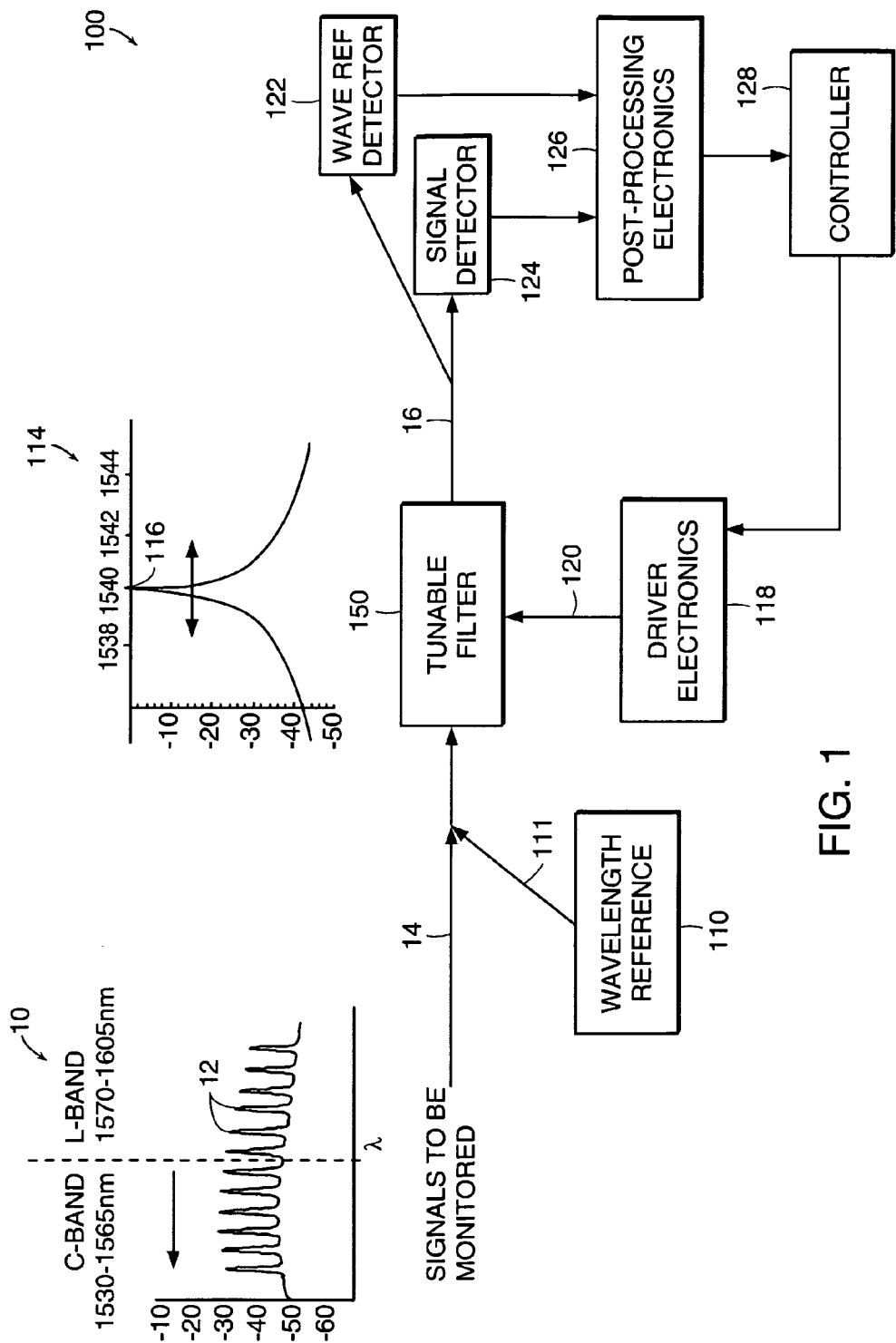
FIG. 1 is a schematic, block diagram illustrating a first embodiment of the optical monitoring system with insets showing the spectral characteristics of the WDM signal and filter transfer function; according to the present invention.

FIG. 1 illustrates an optical system monitoring system 100, which has been constructed according to the principles of the present invention.

In the preferred or typical implementation, the system receives a WDM signal 14, the spectral characteristics of which are illustrated by inset plot 10. Specifically, plot 10 shows power as a function of wavelength. The WDM signal 14 comprises multiple channels or modulated carrier signals 12. In the present scheme, these channels are distributed in two bands, typically termed the C-band, which stretches from 1530 to 1565 nm, and the L-band, which stretches from 1570-1605 nm.

The WDM signal 14 enters the monitoring system 100. According to the first embodiment, a wavelength reference signal 111 from a reference source 110 is added to the WDM signal 14. The combined WDM and wavelength reference signal 14/111 is then filtered by a tunable filter 150. Inset plot 114 illustrates an exemplary filter transfer function for the tunable filter 150. The transmission peak 116 is variable based upon a control signal 120, which is generated by the driver electronics 118 under control of the controller 128. The driver electronics include includes a DC-DC power supply, a ramp generator, a thermo-electric cooler drive circuit, and LED driver.

The combined optical signal 16, which has been filtered by the tunable filter, includes both the filtered wavelength reference signal and the filtered WDM signal 14. The filtered reference signal is then detected by a reference detector 122, and the filtered WDM signal is detected by a signal detector system 124. These detectors yield electronic signals that are received by post processing electronics 126. A subsequent controller 128 performs analysis functions such as channel inventory.

In the preferred embodiment, the post processing electronics 126 includes optical receiver circuits, the signal and wavelength reference and digital hardware, including an analog to digital converter.

Preferably, each detector operates in a differential detection scheme to minimize common-mode noise with gain-switching multiplexor to increase dynamic range. Gain switching is performed with a 4:1 multiplexor and several resistors. This configuration allows for different receiver sensitivities to be obtained via software command of the processor 128. The advantage of doing this is to allow for an increased dynamic range. Each scan is performed several times at different gains and a recorded signal is combined in software.

In the preferred embodiment, the analog to digital converter samples at 200 kilo-samples per second to one Megasamples per second. The controller 128 with the required RAM allows for the storage for samples and processing.

According to the preferred embodiment, the optical channel monitoring system of FIG. 1 has a number of different modes of operation. In a basic mode, that is a single channel scan, an increasing ramp voltage is applied to the tunable filter 150. This drives the changes in the size of the Fabry-Perot cavity of the filter 150 in a quasi-linear fashion. Because of the self calibration, the particular characteristics of the voltage ramp are not critical, since continuous calibration is performed by the inclusion of the out of band reference signal.

Figure 2A:
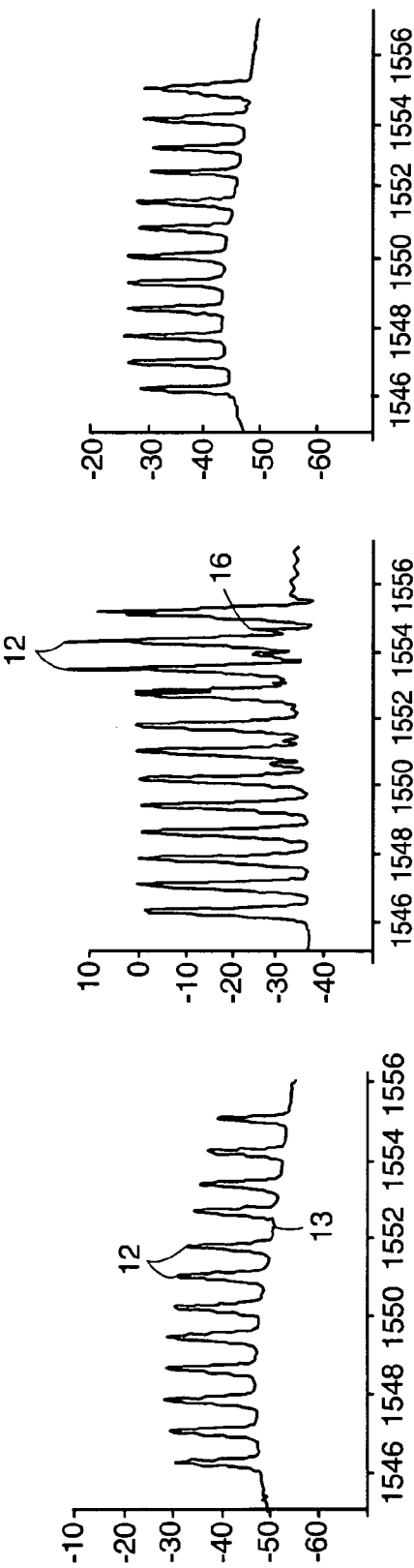
FIGS. 2A, 2B, and 2C are spectral plots of exemplary WDM signals illustrating various problems that can be diagnosed with the optical channel monitoring system of the present invention.
Figure 2B:
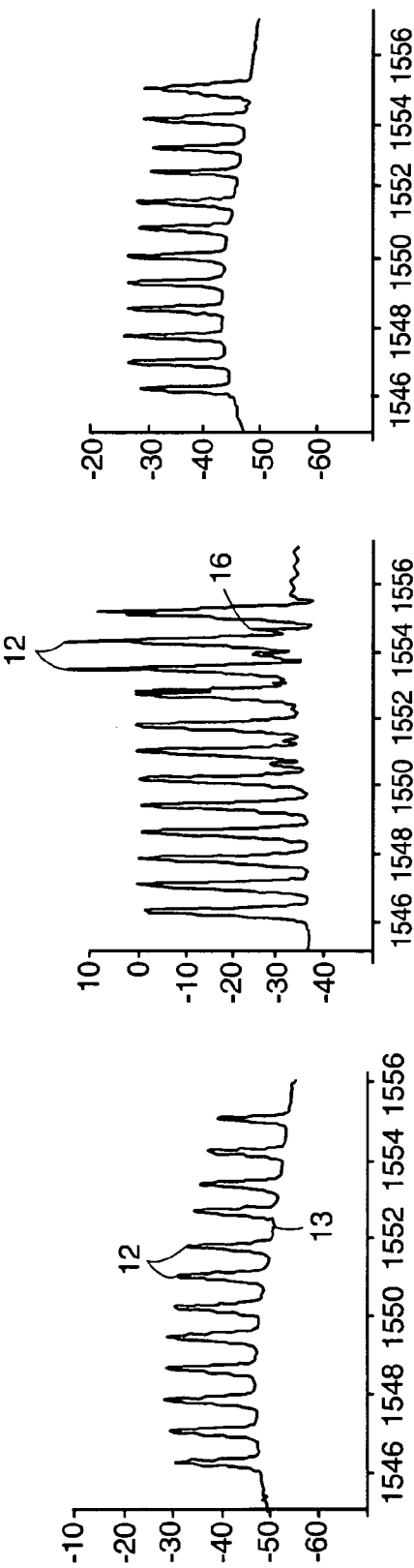
Figure 2C:
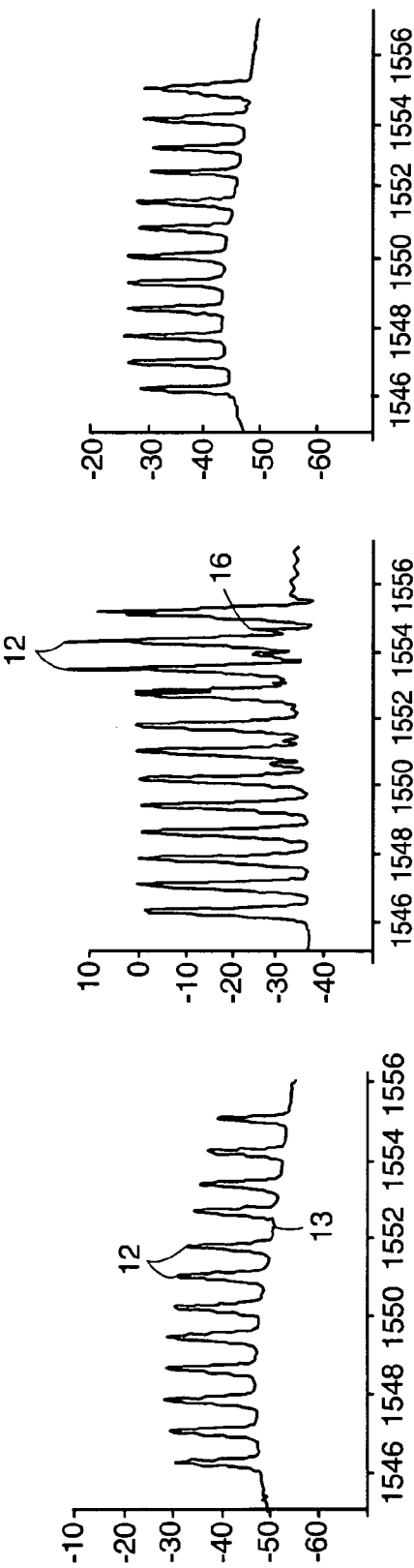

FIGS. 2A, 2B, and 2C illustrate different problems that can be characterized by the optical system monitoring system 100. For example, in FIG. 2A, the relative strengths of the signals 12, along with their absolute signal strengths relative to the noise floor 14, are detectable. This information can be used as a control signal an upstream or downstream variable attenuator. As illustrated in FIG. 2B, inter-channel artifacts 16 are also detected. Finally, as illustrated in FIG. 2C, gain tilt problems, typically added by amplification systems, are also identifiable. Nonetheless, it should be understood that the present invention has applicability to many other applications where the spectral content of a signal is relevant.

Figure 3:
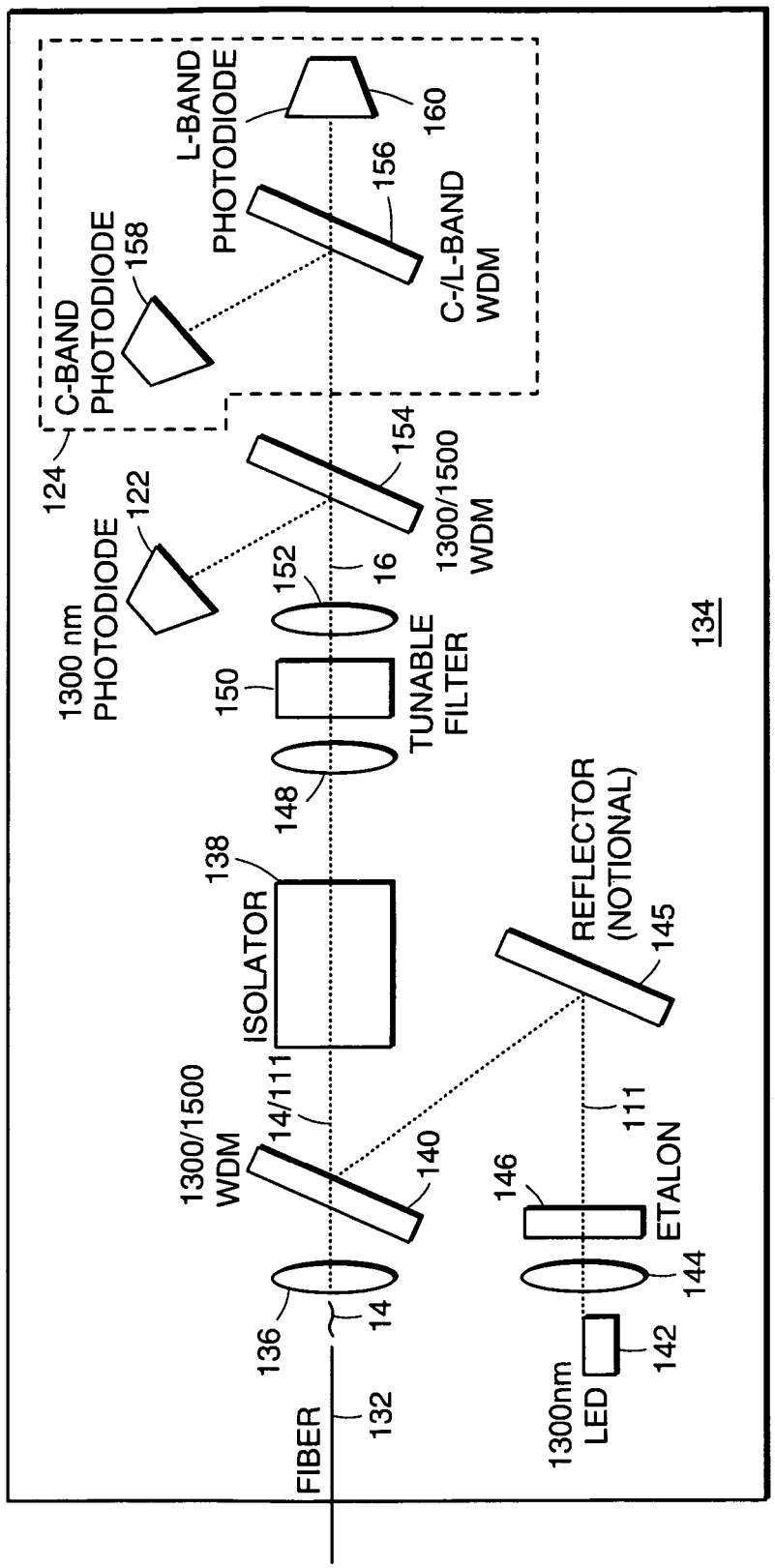
FIG. 3 is a more detailed block diagram illustrating the optical train of a first embodiment of the optical channel monitoring system of the present invention.

FIG. 3 shows the optical train of the optical channel monitoring system.

The fiber 132 terminates above an optical bench 134. The optical signal 14 is emitted out of the typically cleaved or cleaved-polished end-face of the fiber.

The optical signal is typically diverging as it is emitted from the fiber's core. It is collimated by a first collimation lens 136. Preferably, all lenses are formed utilizing mass-transport processes as described in U.S. Pat. No. 5,618,474, the teachings of which are incorporated herein by this reference in their entirety. The invention, however, is compatible with other types of microlense such as those generated by diffractive, binary optics, gradient index processes, or refractive element replication, for example.

A dichroic mirror 140 is used to add the reference signal 111 to the optical signal 14. These dichroic mirrors or filters are typically referred to as WDM filters. In the illustrated implementation, the WDM filter 140 is reflective in a band surrounding 1300 nm, but transmissive in a band surrounding 1500 nm.

In the illustrated embodiment, the 1300 nm reference signal is generated by a light emitting diode 142. In one implementation, the light emitting diode is a super luminescent light emitting diode (SLED).

The diverging beam from the LED is collimated by a second collimating lens 144. An etalon 146 is used to convert the relatively wide-band signal from the SLED into a reference signal with stable spectral characteristics. More specifically, the etalon 146 functions as a Fabry-Perot filter with a 200 GigaHertz (GHz) free spectral range (FSR). This effectively converts the SLED's continuous, broadband spectrum into a signal with energy peaks every 200 GHz. These peaks are stable, particularly when the temperature of the system is controlled by a thermoelectric cooler or is otherwise stabilized.

A fold mirror 145 redirects the reference signal to the WDM filter 140. It should be noted, however, that this mirrors is not required, but is simply used to facilitate integration of the system on a compact bench.

The combined optical signal 14/111 is transmitted through an isolator 138. This component is used to prevent back-reflections from the subsequent optical components into the fiber 132.

A first focusing lens 148 is used to focus the collimated combined beam 14/111 onto a tunable filter 150. After the tunable filter, the beam is recollimated by a third collimating lens 152, and transmitted to a second dichroic/WDM filter 154.

The second WDM filter 154 functions to separate the filtered reference signal from the filtered optical signal in the filtered beam 16 from the tunable filter 150. In the illustrated implementation, the second WDM filter 154 is reflective in a band around 1300 nm, but transmissive in a band around 1500 nm. As a result, the filtered reference signal is directed to the wavelength reference detector 122 for optical-electrical conversion.

The filtered optical signal is transmitted to the signal detector system 124. In the illustrated embodiment, the L- and C-bands are separated from each other by a third WDM filter 156. This WDM filter 156 is reflective to the C-band and transmissive to the L-band. As a result, the C-band of the WDM signal is detected by a C-band photodiode 158; the L-band is transmitted through the WDM filter 156 to be detected independently by an L-band photodiode 160. In other embodiments, more than two bands, such as three or four, are detected simultaneously by adding additional WDM filters and detectors.

The FIG. 3 embodiment provides for out-of-band calibration. This yields the advantage that the calibration can occur simultaneously with wavelength monitoring. Specifically, one or more of the filter's modes are used for signal detection while another mode is used to simultaneously filter the calibration signal.

In alternative embodiments, a similar stable source is used for in-band calibration. One downside to such embodiments, however, is the fact that complex post processing and/or time multiplexing functionality is required upstream of the detectors to switch between signal monitoring and signal calibration.

In alternative embodiments, other LED sources are used, such as LED sources operating at approximately 1400 nm, such as an InGaAsP SLED.

The salient features of the tunable filter 150 are its selectable free spectral range. In the preferred embodiment, the free spectral range is 20 nm <FSR<170 nm at 1550 nm wavelength. It preferably also has high finesse, i.e., greater than 3,000, and a compact size.

In the preferred embodiment, the filter is as described in patent application Ser. No. 09/649,168 filed on Aug. 25, 2000, now U.S. Pat. No. 6,373,632, issued on Apr. 11, 2002, by Flanders, et al., entitled Tunable Fabry-Perot Filter, this application is incorporated herein by this reference.

In the preferred embodiment, a 40 nm FSR is selected. This enables simultaneous scans of the C and L-bands, in addition to calibration relative to the reference band. Generally, to enable simultaneous scanning, the FSR of the filter must be greater than the bandwidth of at least one of the bands of interest so that successive modes of the filter can access both bands simultaneously. The FSR, however, must be less than the combined bandwidth of bands, again to enable simultaneous access. Generally, the FSR is determined by the length 1 of the Fabry-Perot cavity in the filter, RSR=2 l/c.

This three-way simultaneous scanning reduces the total scan time while providing for simultaneous calibration. In other embodiments, the free spectral range of the tunable filter is increased to 57.5 nm to enable monitoring of the optical service channels that flank the C- and L-bands.

In some implementations, a spatial mode aperture is used in conjunction with the tunable filter. Such intra-filter apertures are desirable when extra cavity mode control devices are not used. For example, in some other implementations, a length of single mode fiber follows the filter to attenuate higher order modes.

Figure 4:
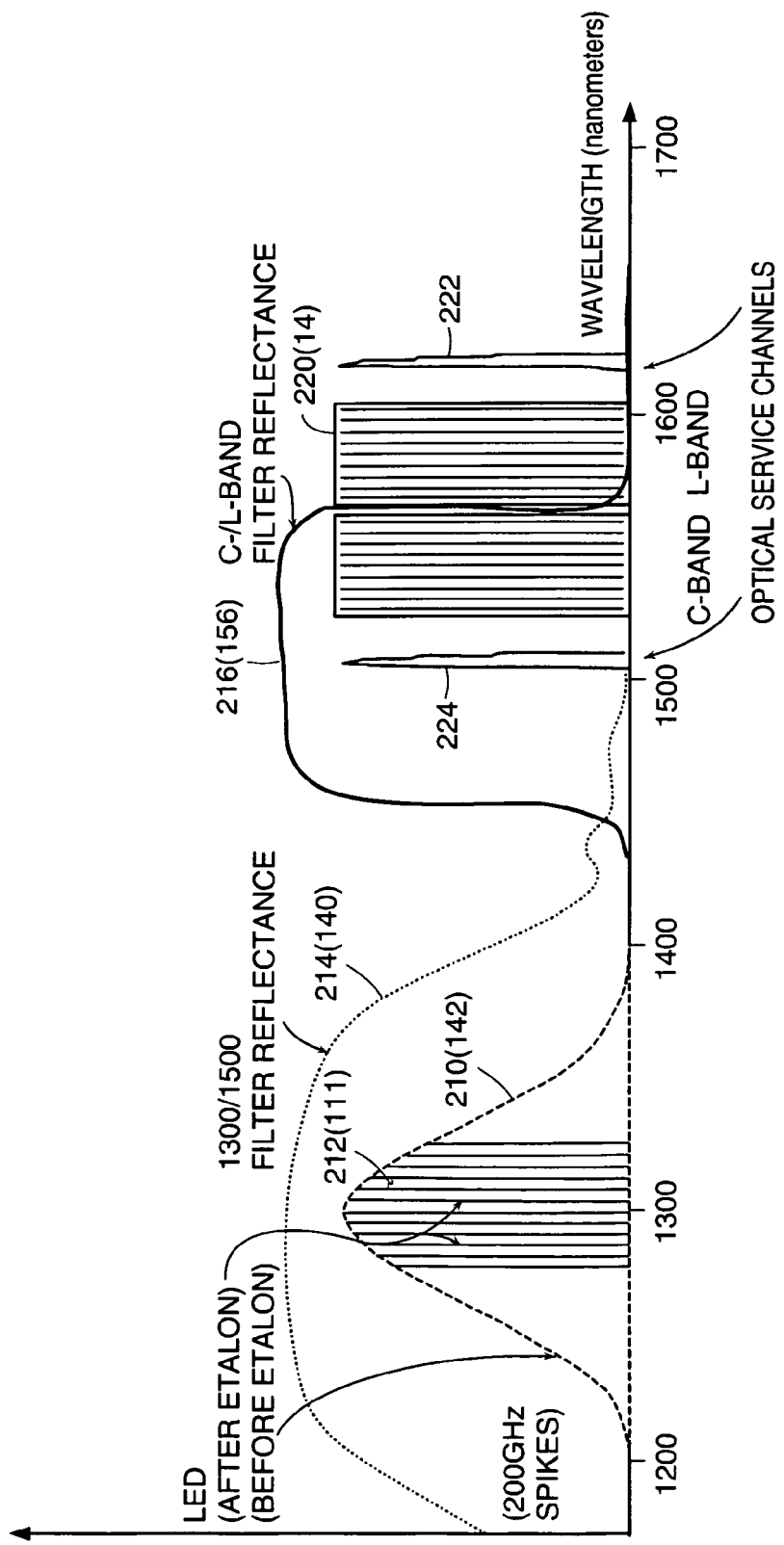
FIG. 4 is a spectral plot illustrating the WDM system and reference signals of the first embodiment of the optical channel monitoring system of the present invention.

FIG. 4 is a plot of power as a function of wavelength illustrating the spectral relationships between the active and passive optical components of FIG. 3 embodiment.

Plot 210 illustrates the spectrum of the light emitted by the SLED 142. As illustrated, it is a relatively broadband signal stretching from approximately 1250-1350 nm. The etalon, however, functions as a Fabry-Perot filter to convert the wideband output to a series of spikes spaced at 200 GHz centered around 1300 nm.

Plot 214 illustrates the reflectance of the first WDM filter 140. It is reflective in the 1300 nm range, but transmissive around the 1550 nm range. This allows the combination of the reference signal 111 and the optical signal 14 to produce the combined signal 14/111.

Plot 220 shows an exemplary optical signal 14, comprising multiple energy spikes associated with each channel, stretching across the C and L-bands between approximately 1500 nm to over 1600 nm. Spectrally on either side of the channels are two optical service channels 222, 224, which can be used to transmit additional channel information.

Plot 216 is the reflectance curve of the third WDM filter 156. It has a sharp transition between the C and L-bands to thereby separate the two bands so that they can be separately detected by the C-band photodiode 158 and the L-band photodiode 160.

Figure 5:
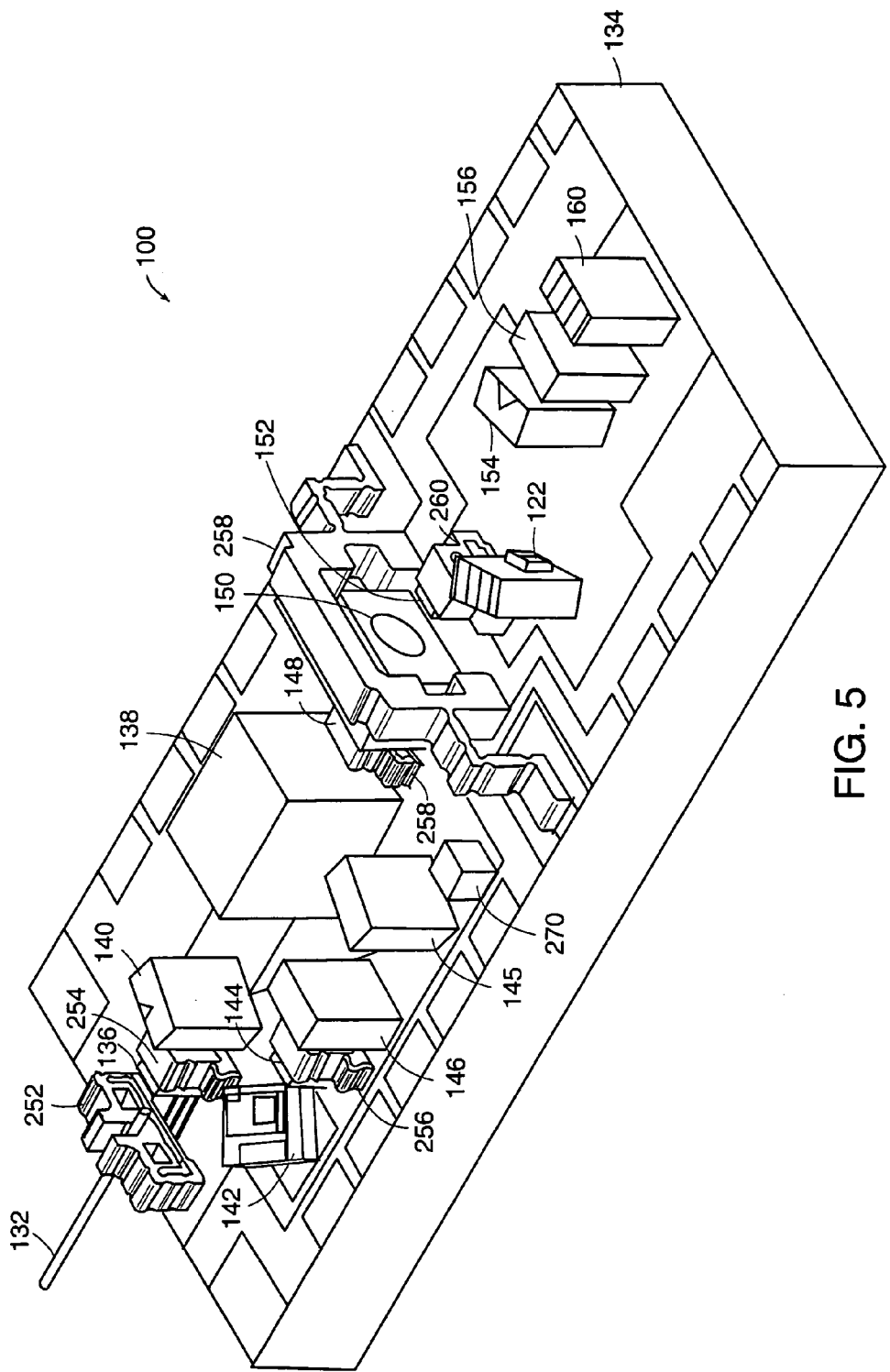
FIG. 5 is a perspective view of the integrated optical channel monitoring system of the first embodiment of the present invention.

FIG. 5 illustrates the integration of the optical channel monitoring system 100 on a single, miniature optical bench 134. It also illustrates a second embodiment of the optical channel monitoring system, which does not have separate detectors for the C- and L-bands. Instead, a single detector 160 is used to detect the optical signal. This has the advantage of simplified construction, but negates any opportunity for simultaneous C- and L-band scanning. In one implementation, t relies on an increased filter spectral range of about 115 nm or greater to scan the entire signal band of interest. In other implementations, the C/L band WDM filter 156 is installed in front of the detector 160 to provide for C or L band scanning only.

Specifically, the fiber 132 is terminated on the bench 134 at a mounting and alignment structure 252. This mounting and alignment structure 252 holds the fiber in proximity to the first collimating lens 136 held on its own mounting and alignment structure 254.

In the reference signal optical train, the SLED 142 generates the broadband beam, which is focused by the second collimating lens 144 held on mounting and alignment structure 256. This collimates the beam to pass through the etalon 146 installed on the bench 134. The reference beam generated by the etalon is reflected by fold mirror 145 to the first WDM filter 140. As a result, the combined beam 14/111 is transmitted to the isolator 138, which is installed directly on the bench 134 in the illustrated implementation.

After the isolator, a focusing lens 148 held on mounting and alignment structure 258 focuses the combined beam onto the tunable filter 150, which is held on the filter mounting and alignment structure 258. The beam from the filter 150 is re-collimated by a third collimating lens 152 held on mounting and alignment structure 260. This beam is then separated into the reference beam and the optical signal by a second WDM filter 154. The reference signal is detected by detector 122. The filtered optical signal is transmitted through the second WDM filter 154 to the signal photodiode 160.

Figure 6:
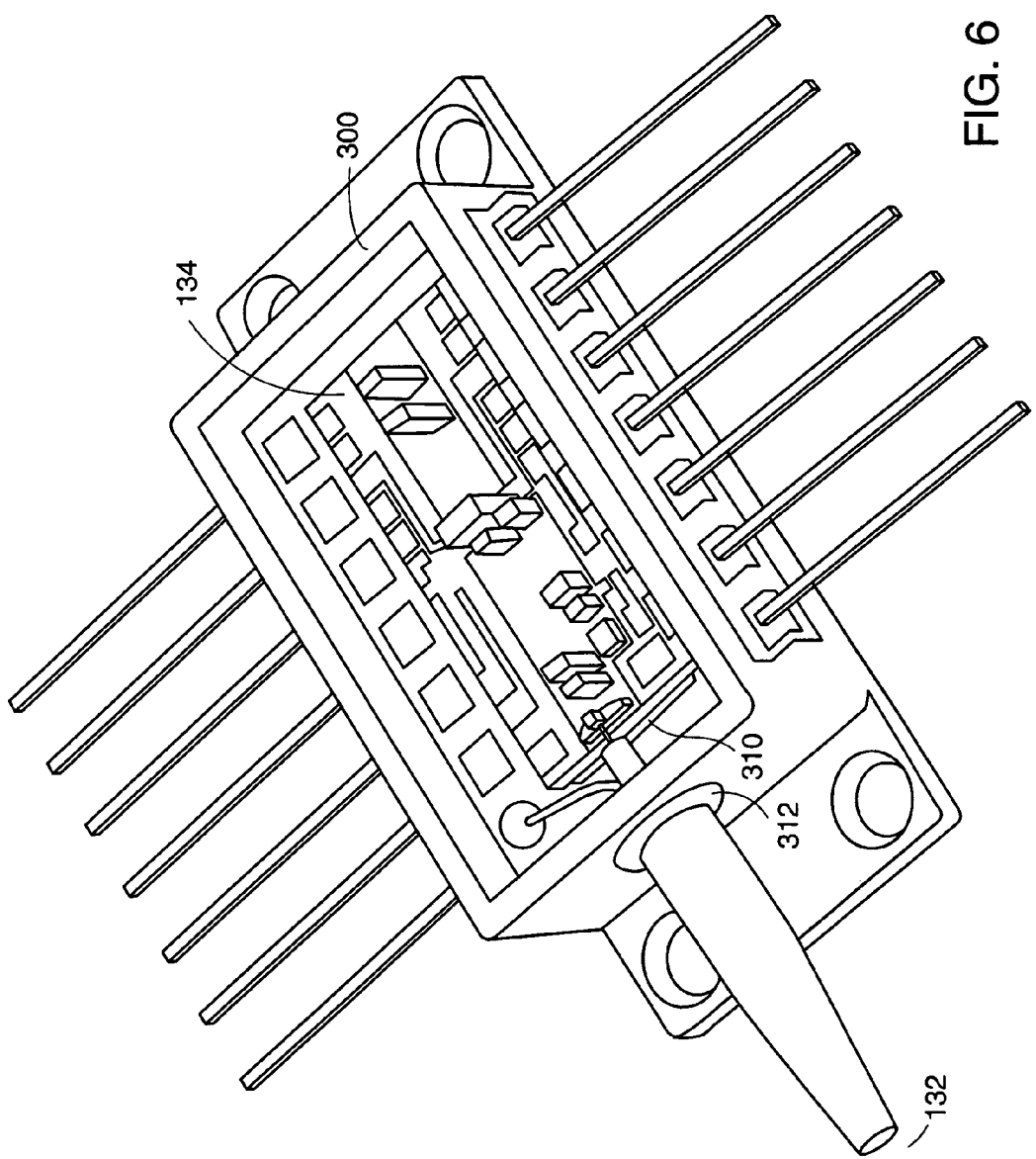
FIG. 6 is a partial perspective view showing a hermetic package with its top removed and the optical bench installed inside the package.

Also shown is the installation of the thermistor 270, which is used by the controller to control the package's thermoelectric cooler FIG. 6 illustrates the installation of the optical bench 134 into a hermetic package 300. The thermoelectric cooler 310 is installed under the bench 134. The optical fiber 132 passes through an optical fiber feed through 312 to terminate on the optical bench 134. In the figure, the hermetic package 300 has its top removed. Preferably, this is a standard 0.75×0.5 inch butterfly hermetic package.

Figure 7:
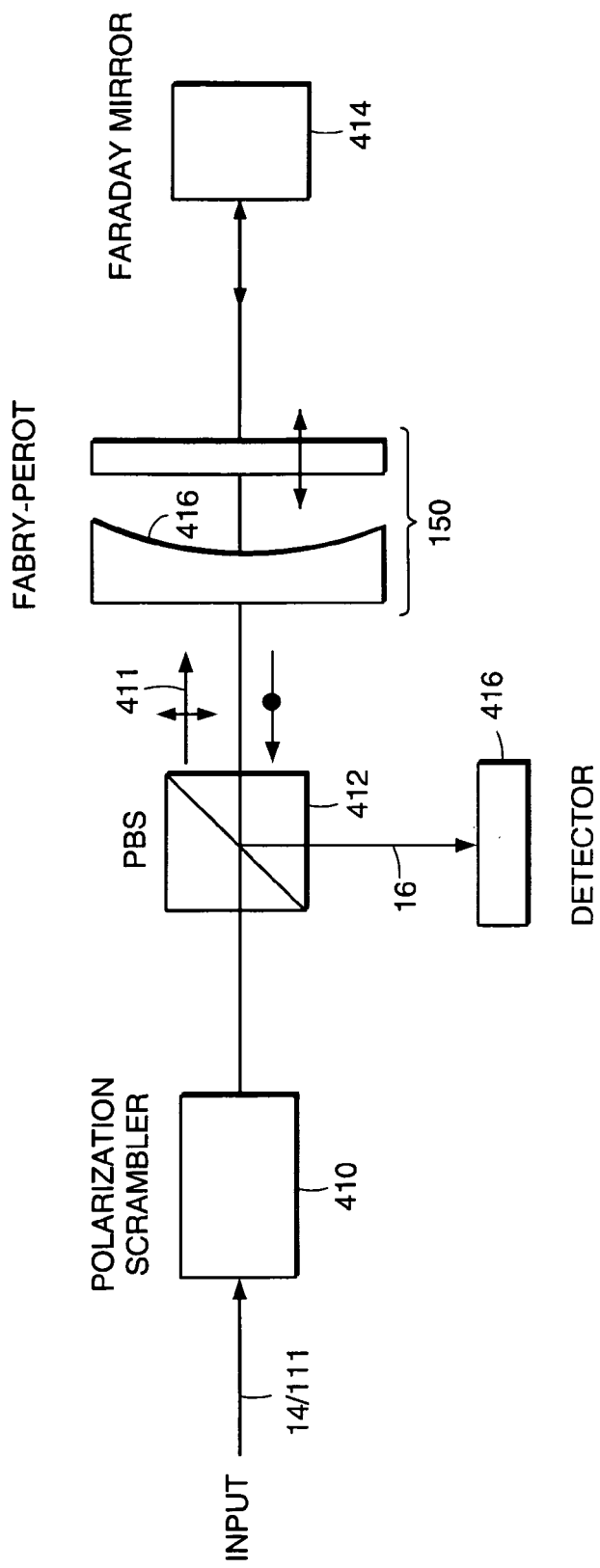
FIG. 7 is a schematic diagram showing an alternative implementation of a portion of the optical train surrounding the tunable filter in which the filter is arranged in a double pass configuration.

FIG. 7 is a block diagram illustrating the configuration of the tunable filter according to a third embodiment of the present invention. In this embodiment, the tunable filter 150 in FIG. 3, for example, is replaced with the illustrated system.

Specifically, the combined optical signal/reference signal 14/111 from the isolator 138 is sent through a polarization scrambler 410. This yields an unpolarized signal, of which 50% passes through polarization beam splitter 412. The transmitted signal is indicated by reference numeral 411. The polarization scrambler ensures that the incoming beam has a uniform distribution of polarization states so that the polarization beam splitter always passes exactly 50% of the light. Without the scrambler, the incoming beam could have had its polarization state either parallel or perpendicular to the polarization beam splitter, or an intermediate state, meaning that the transmitted beam would have varied between 0 and 100%.

The optical signal essentially passes through two, series, synchronized Fabry-Perot filter cavities 416. This is accomplished by sending the signal to the right, in FIG. 7, through the tunable filter 150, reflecting the signal with a Faraday mirror 414 and then sending the signal back through the Fabry-Perot cavity 416 a second time. The Faraday mirror 414 has the effect of rotating the polarization of the beam 411 by 90 degrees.

The signal with the rotated polarization is separated by the polarization beam splitter 412 and is output as signal 16. This combined and twice-filtered signal is sent to a single detector, a detector system, or L-band, C-band, and reference signal photodetectors 122, 158, 160, depending on the implementation/embodiment.

Figure 8:
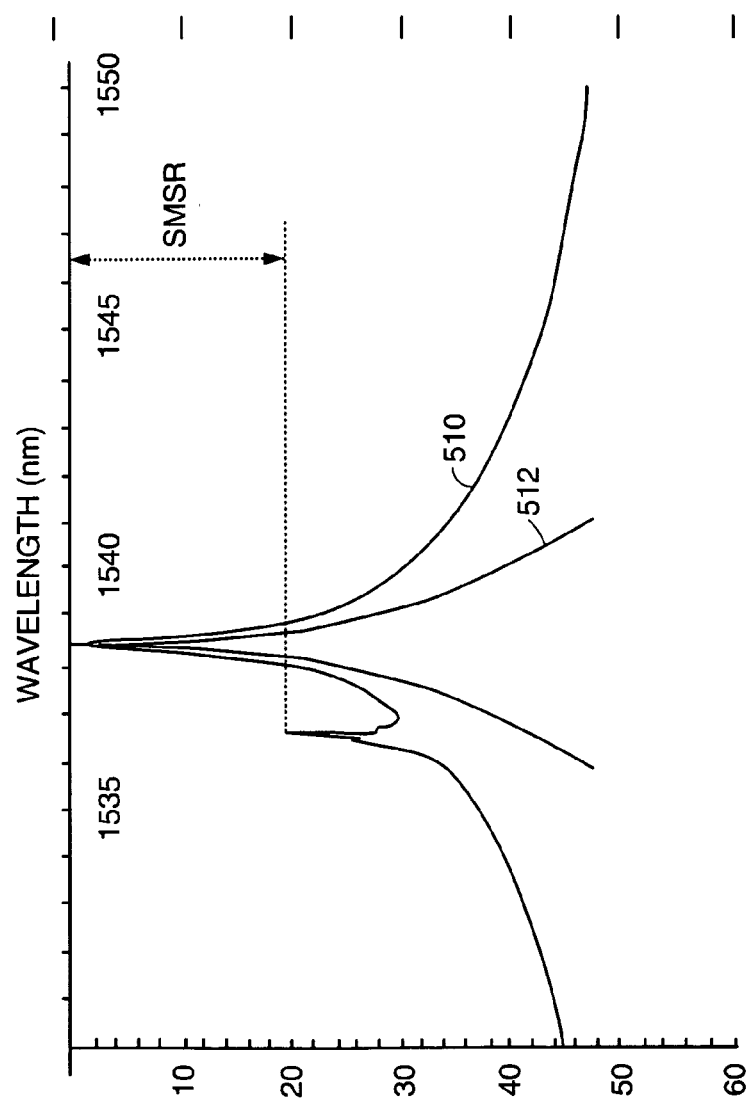
FIG. 8 is a spectral plot of the filter's transfer function in a single and double pass configuration, according to the invention.

FIG. 8 illustrates in increased wavelength selectivity obtained by the double pass or two filter cavity arrangement. The transfer function a single pass filter is illustrated by plot 510—whereas in the double-pass configuration, much steeper transfer function is achieved as illustrated by plot 512.

The double-pass or two filter cavity configuration has the advantage of also de-emphasizing any side lobes in the filter's transfer function.

Figure 9:
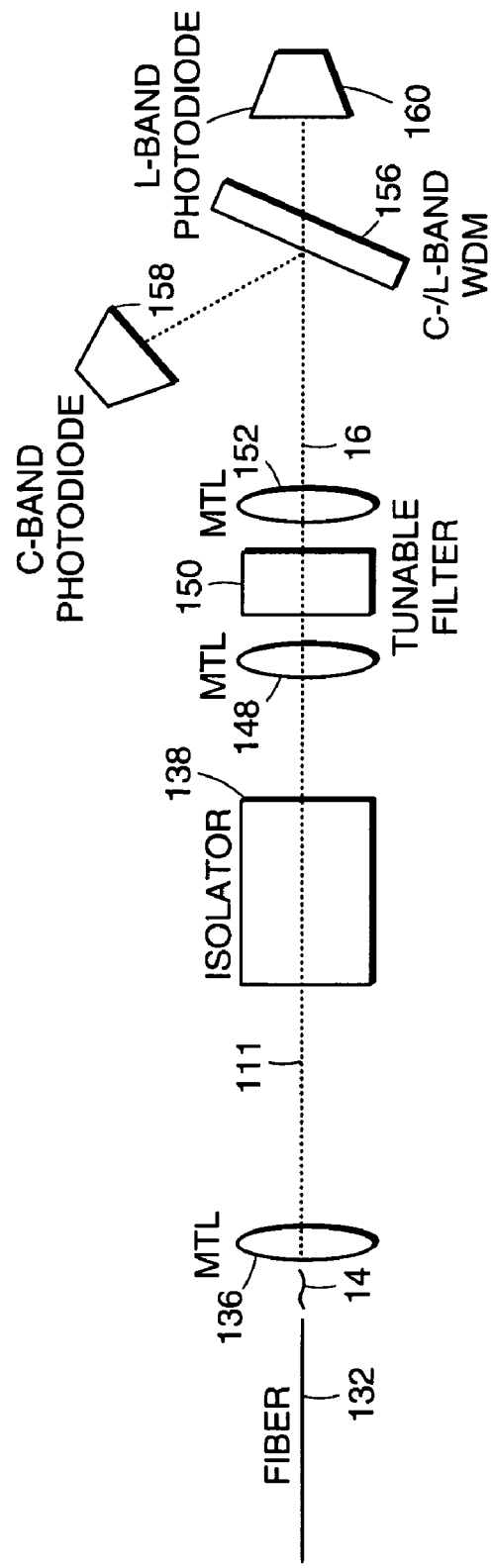
FIG. 9 is an optical train of an optical power monitor without the integrated reference signal source/detector.

FIG. 9 shows the optical train according to still another embodiment of the present invention. This configuration is termed an optical power monitoring system. The reference signal is not present. C-band and L-band photodiodes 158, 160, however, are provided. This is useful when the relative spacing of the optical channels 12 is important, but not necessarily the absolute wavelengths of those optical channels 12 in the optical signal 14.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical monitoring system, comprising:
   having spectral information distributed within a first spectral band and a second spectral band;
   a tunable filter that filters the optical signal;
   driver electronics including a ramp generator for applying a ramp drive voltage to the tunable filter to scan transmission peaks of the tunable filter across the first spectral band and the second spectral band;
   a dichroic filter that separates the first spectral band from the second spectral band in the filtered optical signal from the tunable filter;
   a first optical signal detector for detecting spectral information in the first spectral band in the filtered optical signal; and
   a second optical signal detector for detecting spectral information in the second spectral band in the filtered optical signal.

2. An optical monitoring system as claimed in claim 1, further comprising an isolator for suppressing back reflections into a signal source for the optical signal.

3. An optical monitoring system as claimed in claim 1, further comprising:
   a reference source for generating a reference signal outside of the first and second spectral bands; and
   a reference signal detector for detecting the reference signal post filtering by the tunable filter.

4. An optical monitoring system as claimed in claim 3, wherein the reference source comprises:
   a broadband source; and
   an etalon that generates a reference signal with stable spectral characteristics.

5. An optical monitoring system as claimed in claim 4, wherein the etalon functions as a Fabry-Perot filter to generate a reference signal with spectrally-spaced energy peaks from a broad band signal from the broadband source.

6. An optical monitoring system as claimed in claim 1, wherein the first and second spectral bands are L and C-communication bands.

7. An optical monitoring system as claimed in claim 1, wherein a free spectral range of the tunable filter is selected to enable simultaneous detection in the first spectral band and the second spectral band.

8. An optical monitoring system as claimed in claim 1, wherein a free spectral range of the tunable filter is greater than a range of the first spectral band and the second spectral band individually and less than a range of the first spectral band added to the range of the second spectral band.

9. A method for optical signal monitoring, comprising:
   receiving an optical signal having spectral band;
   applying a ramp drive voltage to a tunable filter to scan transmission peaks of the tunable filter across the first spectral band and the second spectral band;
   filtering the optical signal with the tunable filter;
   separating the first spectral band from the second spectral band in the filtered optical signal;
   detecting channels in the first spectral band in the filtered optical signal; and detecting channels in the second spectral band in the filtered optical signal.

10. A method as claimed in claim 9, further comprising suppressing back reflections into signal source of the optical signal.

11. A method as claimed in claim 9, further comprising generating the reference signal and filtering the reference signal.

12. A method as claimed in claim 9, further comprising:
generating a reference signal; and
filtering the reference signal simultaneously with the optical signal.

13. A method as claimed in claim 9, further comprising simultaneously filtering the first and second spectral bands in the optical signal.

14. A method as claimed in claim 9, wherein the first and second spectral bands are L and C-communication bands.

15. A method as claimed in claim 9, further comprising controlling a free spectral range of the tuning step to enable simultaneous detection in the first spectral band and the second spectral band.

* * * * *

UNITED STATES PATENT AND TRADEMARK OFFICE
CERTIFICATE OF CORRECTION

PATENT NO. : 7,348,541 B1
APPLICATION NO. : 09/648263
DATED : March 25, 2008
INVENTOR(S) : Jeffrey A. Korn et al.

It is certified that error appears in the above-identified patent and that said Letters Patent is hereby corrected as shown below:

On the face sheet of the patent at (57) Abstract, lines 12-13, change "respective spectral bands to the filtered optical signal" to --respective spectral bands in the filtered optical signal--.

In column 8, claim 1, line 12, insert --an optical signal-- before "having spectral information distributed".

In column 9, claim 9, line 59, insert --spectral information distributed within a first spectral band and a second-- between "receiving an optical signal having" and "spectral band".

Signed and Sealed this

Seventh Day of April, 2009

JOHN DOLL
*Acting Director of the United States Patent and Trademark Office*